No. 855,804. PATENTED JUNE 4, 1907.
P. PANOULIAS.
DIPPING FRAME FOR COATING CANDIES.
APPLICATION FILED SEPT. 7, 1906.
2 SHEETS—SHEET 2.
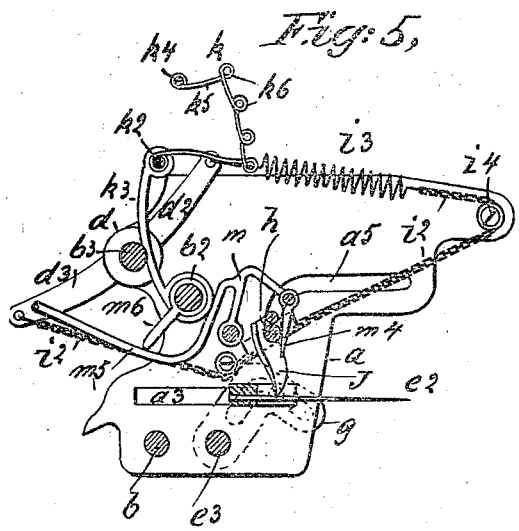
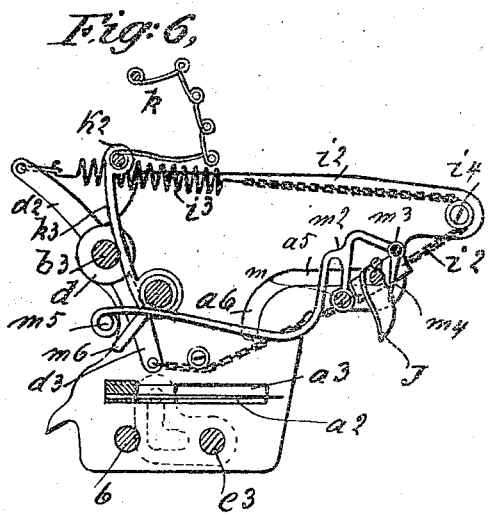
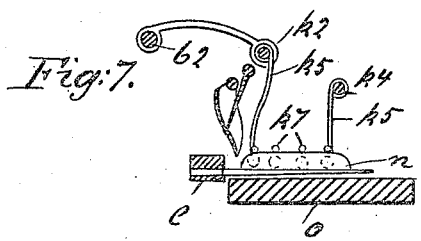
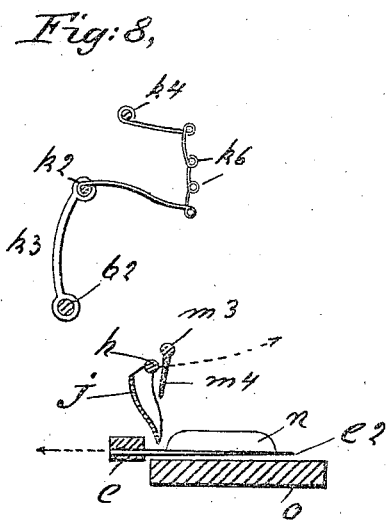
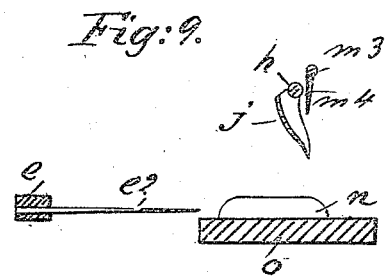
WITNESSES
INVENTOR
Panayiotis Panoulias,
BY Edgar Tate & Co.
ATTORNEYS.

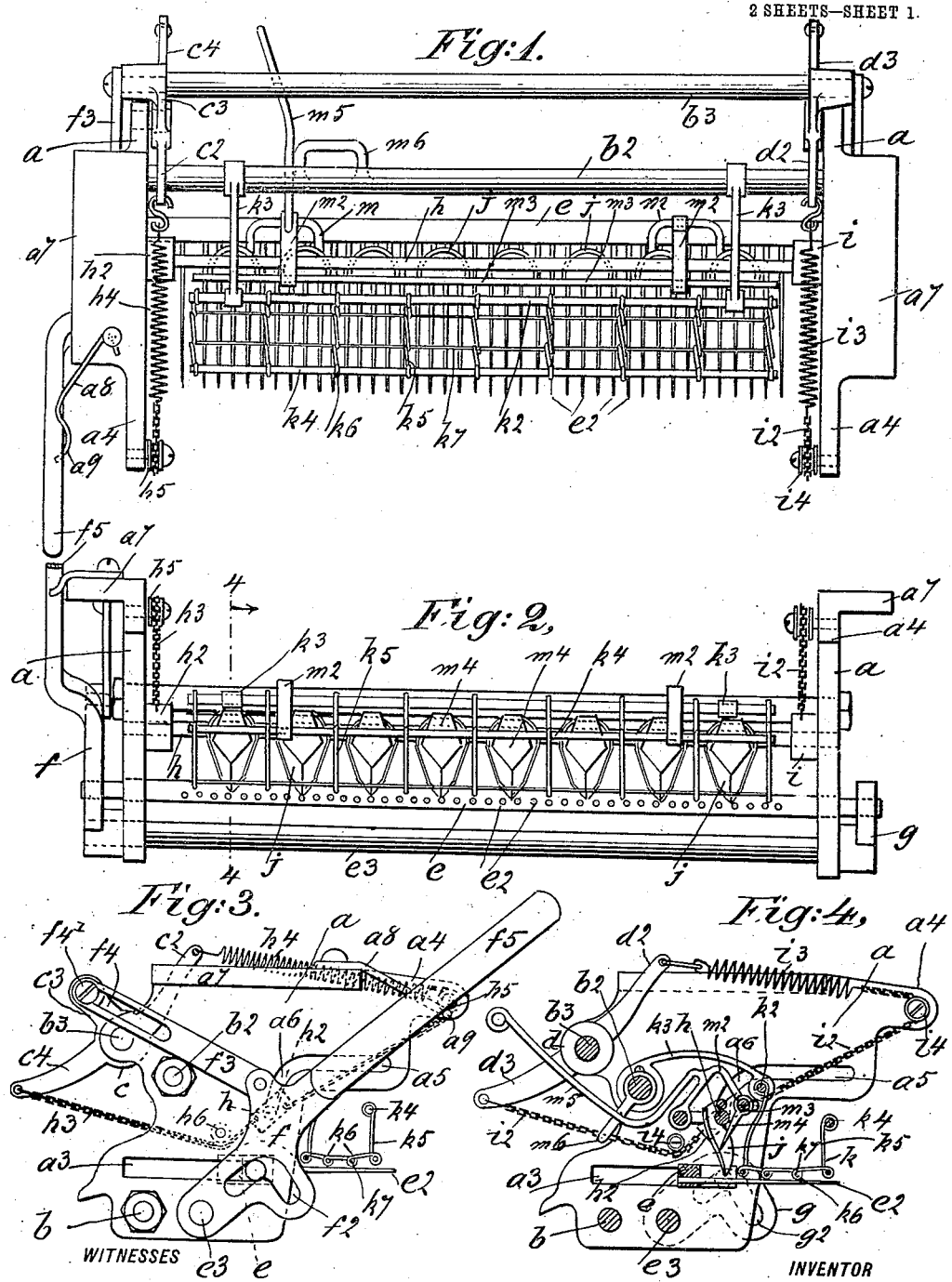

UNITED STATES PATENT OFFICE.

PANAYIOTIS PANOULIAS, OF NEW YORK, N. Y.

DIPPING-FRAME FOR COATING CANDIES.

No. 855,804.

Specification of Letters Patent.

Patented June 4, 1907.

Application filed September 7, 1906. Serial No. 333,640.

*To all whom it may concern:*

Be it known that I, PANAYIOTIS PANOULIAS, a subject of the King of Greece, and residing at New York, in the county of New York and State of New York, have invented certain new and useful Improvements in Dipping-Frames for Coating Candies, of which the following is a specification, such as will enable those skilled in the art to which it appertains to make and use the same.

This invention relates to dipping frames for use in coating candies with chocolate or similar material, and the object thereof is to provide an improved dipping frame or device of this class by means of which candies or candy cores may be immersed in liquid chocolate or other material so as to coat the same; a further object being to provide a dipping frame of the class described whereby the coated candies are marked to simulate the form of hand dipped candies; a further object being to provide a dipping frame of the class described adapted either for manual or mechanical operation or agitation; and with these and other objects in view the invention consists in a device of the class specified, constructed as hereinafter described and claimed.

The invention described and claimed herein is an improvement on that described and claimed in United States Patent No. 809,737 granted to me on the 9th day of January, 1906, and the particular invention which forms the basis of this application consists in the means employed for holding the candies in position while they are being dipped and while the frame is being agitated to distribute the chocolate, and in the particular means employed for marking the candies after they have been coated, and when they are discharged from the frame onto a board or other holder.

The invention is fully disclosed in the following specification, of which the accompanying drawing forms a part, in which the separate parts of my improvement are designated by suitable reference characters in each of the views, and in which:—

Figure 1 is a plan view of my improved candy dipping frame; Fig. 2 a front view thereof; Fig. 3 a right hand end view of said frame; Fig. 4 a transverse section on the line 4—4 of Fig. 2; Fig. 5 a view similar to Fig. 4 but showing some of the parts in a different position; Fig. 6 a view similar to Figs. 4 and 5 but showing the parts in a still different position; Fig. 7 a transverse sectional view of certain details of the construction and showing the candies, or one of them, in the position it occupies after the dipping and agitating process, and just before the candy or candies are deposited on a board or other holder; Fig. 8 a view similar to Fig. 7 but showing the parts in a different position; Fig. 9 a view similar to Figs. 7 and 8, or a part of the parts shown in said figures, and showing said parts in a different position.

In the construction of my improved candy dipping and coating frame as shown in the drawing, I provide two end plates $a$ rigidly connected by horizontal and parallel rods $b$ and $b^2$ connected with the back lower part and back central part of said end plates or members $a$, and each of said end plates or members is provided in the bottom portion thereof with a horizontal slot or opening $a^3$ and with a forwardly directed portion or arm $a^4$ in the bottom part of which is formed a slot or opening $a^5$ which ranges forwardly and backwardly and the rear end portion of which is curved downwardly, or provided with a downwardly directed extension $a^6$.

Mounted in the top back portion of the frame plates or members $a$ is a rotatable rod $b^3$ provided at the right hand end of the device, as shown in the drawing, with a collar $c$ having a forwardly and upwardly directed arm $c^2$, a backwardly and upwardly directed short arm $c^3$, and a backwardly and downwardly directed arm $c^4$, and said rod is provided at the opposite end thereof with a collar $d$ having a forwardly and upwardly directed arm $d^2$ and a backwardly and downwardly directed arm $d^3$.

Mounted in the bottom horizontal slots or openings $a^3$ in the end plates or members $a$ and movable forwardly and backwardly therein is a rod or bar $e$ having a plurality of equally spaced and forwardly directed pins $e^2$; and mounted in the bottom portions of the end plates or members $a$ under the slots or openings $a^3$ is a rotatable rod $e^3$ to one end of which, the right hand end as shown in the drawing, is secured an arm $f$, that part of which adjacent to the rod $e^3$ is widened and provided with an inverted V-shaped slot or opening $f^2$, and the corresponding end of the bar $e$ passes through said slot or opening as clearly shown, and pivoted to the arm $f$ above the slot or opening $f^2$ is a link member $f^3$ having a longitudinal slot $f^4$ through which is passed a headed screw, pin or similar device $f^{4'}$ which is secured to the upwardly and backwardly directed short arm $c^3$ of the collar $c$ on the rotatable rod $b^3$.

The left hand end of the rotatable rod $e^3$ is provided with a curved arm $g$ which is shown in full lines in Fig. 2 and partially in full and partially in dotted lines in Fig. 4, and which is of exactly the same shape as that part of the arm $f$ in which the inverted V-shaped slot $f^2$ is formed, and the arm $g$ is also provided with a slot or opening $g^2$ similar to the inverted V-shaped slot or opening $f^2$ in the arm $f$, and the corresponding end of the bar $e$ passes therethrough, and the operation of the rotatable rod $e^3$ as hereinafter described moves the rod or bar $e$ forwardly and backwardly in the slots or openings $a^3$, and the operation of the arm $f$, which is accomplished by means of the handle member $f^5$ thereof, also rotates the rod $b^3$.

Mounted in the slots or openings $a^5$ in the opposite end plates or members $a$, said slots or openings being substantially L-shaped in form, is a rod $h$ provided at its right hand end and inside of the corresponding end plate or member $a$ with a collar $h^2$, to which is secured a chain or similar flexible device $h^3$ one end of which is connected with the arm $c^4$ of the collar $c$ on the rotatable rod $b^3$, and the other end of which is connected with a spiral spring $h^4$ which is secured to the arm $c^2$ of said collar, and the chain $h^3$, or the front part thereof, is carried forwardly and passes around a pulley or roller $h^5$ supported in the front end of the corresponding part $a^4$ of the corresponding end plate or member $a$, and the back part of said chain is passed around a roller or similar support at $h^6$ connected with the said end plate or member $a$ below and rearwardly of the rear end of the L-shaped slot or opening $a^5$. Although the flexible device $h^3$ is described as a chain, it will be seen that it actually consists of two chains or similar devices one of which is connected with the arm $c^4$ and with the collar $h^2$, and the other with said collar and the spring $h^4$. The opposite end portion of the rod $h$ is also provided with a collar or block $i$ similar to the collar or block $h^2$, and a chain $i^2$ composed of two parts is connected with said collar or block in the same manner as the chain $h^3$, one part of said chain $i^2$ being connected with a spiral spring $i^3$ which is secured to the arm $d^2$ of the collar $d$ on the rotatable shaft $b$, and the other part of the chain $i^2$ being secured to the arm $d^3$ of the collar $d$, and the said chain $i^2$, or the parts thereof, are passed around rollers or supports $i^4$ on the corresponding end plate or member $a$, the same as the rollers or supports $h^5$ and $h^6$ around which the chain $h^3$, or the parts thereof, are passed, and with this construction the movement of the arm $f$ will move the rod or bar $e$ forwardly and backwardly in the slots or openings $a^3$ and will move the rod $h$ forwardly and backwardly in the slots or openings $a^5$, and will rotate the rod $b^3$, and it will be observed that when the rod $h$ is in its rearmost position it is also in its lowest position, and the forward movement of this rod also raises it and shoves it forwardly into the position shown in Fig. 2, this operation being performed by pulling the arm $f$ backwardly and downwardly.

Rigidly secured to the rod $h$ and depending therefrom and spaced at regular intervals thereon are candy spacers and markers $j$ which are scoop-shaped or spoon-shaped in cross section, and in the form of construction shown a smaller rod is secured on top of the rod $h$ and to which the candy spacers and markers $j$ are also secured, the object of this construction being to provide a better and more rigid support for the spacers and markers $j$.

Mounted on the rod $h$ and rotatable thereon is a candy holder frame $k$ designed to hold the candies on the fingers $e^2$ while the said candies are dipped into chocolate and the frame agitated, and this frame comprises an upper back rod $k^2$ connected with the rod $b^2$ by arms $k^3$ which are free to turn on the said rod.

The candy holder frame $k$ is U-shaped in cross section and comprises in connection with the rod $k^2$ a front rod $k^4$ and transversely arranged wires $k^5$, the bottom portions of which are formed into rings or eyes $k^6$ through which are loosely passed flexible cords $k^7$ by means of which the candies are held on the pins $e^2$ as shown in Fig. 7, and the candy holding frame $k$ may be turned back into the position shown in Figs. 5 and 6 or forwardly into the position shown in Figs. 3, 4 and 7 by hand independently of the movement of the other parts of the machine which are accomplished by means of the arm $f$.

The rod $h$ is provided with backwardly directed yokes or loop-shaped members $m$ to which are pivoted upwardly and forwardly directed L-shaped arms $m^2$ the free ends of which carry a longitudinally arranged rod $m^3$ with which are connected equally spaced tongues $m^4$ which equal in number the candy spacers and markers $j$, and one of the arms $m^2$, preferably the arm nearest the right hand end of the device, is provided with a supplemental spring arm $m^5$ which is curved downwardly and backwardly and under the rod $b^2$, and then upwardly, and the rod $b^2$ is provided with a yoke or loop-shaped member $m^6$ in connection with which the supplemental spring arm $m^5$ operates to hold the rod $m^3$ and the tongues $m^4$ thereon or connected therewith in the required position as hereinafter described.

The end plates or members $a$ of the dipping frame are provided at the top thereof with outwardly directed flanges or supplemental plates $a^7$ which constitute handle members by means of which said frame may be manipulated, and the right hand member $a^7$ is provided with a forwardly directed spring arm $a^8$ provided at its end with a loop $a^9$ adapted to receive the handle $f^5$ of the arm $f$ and hold said arm in a rearward position.

In the use of my improved dipping frame the arm $f$ is moved forwardly so as to project the bar $e$ with the needles $e^2$ into their foremost position as shown in Figs. 1 and 3, and also substantially shown in Figs. 4 and 5, and this operation moves the rod $h$ downwardly and backwardly as shown in Figs. 4 and 5 in which position the candy spacers and markers $j$ depend from the bar $h$ directly over the rear end portions of the pins $e^2$. In this position of the parts the candies are placed on the pins $e^2$ at regular intervals, one of said candies being placed against each of the spacers and markers $j$, and one of said candies being shown at $n$ in Figs. 7, 8 and 9, and after the candies have been placed on the pins $e^2$ the holder frame $k$ is turned down into the position shown in Figs. 1, 3, 4 and 7, in which position the flexible cords $k^7$ pass over the tops of said candies and hold them on the pins $e^2$. The weight of the holder frame $k$ will be sufficient to hold it in the position shown in said figures and also to hold the candies in position on the pins $e^2$, and said holder frame when turned backwardly into the position shown in Fig. 5 also normally rests in said position, but any suitable means may be provided for securing said frame in either of said positions if desired. At this time the rod $m^3$ with the tongues $m^4$ is also turned into operative position as shown in Figs. 4 and 5 in which position the tongues $m^4$, or the points thereof, enter the scoop or spoon-shaped spacers and markers $j$. In this position of the rod $m^3$ the supplemental spring arm $m^5$ bears on the right hand end portion of the yoke or loop-shaped member $m$ in connection with which it operates. The dipping frame is then grasped by means of the handle members $a^7$ and the bottom portion of the frame is dipped into a tub or vat of liquid chocolate so that the candies will be thoroughly coated with the chocolate or similar material. The frame is then lifted out of the chocolate and agitated by hand in the usual manner so as to thoroughly distribute the chocolate over the candies, or this operation of shaking or agitating the frame may be accomplished by any suitably constructed machine, and this operation also removes all surplus chocolate both from the candies and from the frame. At the end of this operation the frame may be placed on a table or other support and a narrow strip or board as shown in Figs. 7, 8 and 9 is placed under the pins $e^2$, and the supplemental spring arm $m^5$ is swung downwardly and beneath the yoke-shaped device $m^6$, which operation raises the rod $m^3$ and the tongues $m^4$ connected therewith, and at this time the arm $f$ is swung backwardly into its rearmost position. This operation moves the bar $e$ backwardly into its rearmost position, the needles $e^2$ moving backwardly therewith, and drops the candies onto the board or other device $o$ shown in Fig. 9. At the same time the rod $h$ carrying the spacers and markers $j$ is raised and moved into its foremost position as shown in Figs. 6 and 9, and in this operation the amount of surplus chocolate held by the spacers and markers $j$ is distributed over each of the candies so as to make a mark thereon, this mark consisting of a thickened raised strip or portion of chocolate extending across the body portion of the candies over or upon the regular coating of chocolate with which said candies are provided.

The object of the tongues $m^4$ on the rod $m^3$ is to hold a certain amount of chocolate in the spoon-shaped spacers and markers $j$ which amount of chocolate will be discharged from said spacers and markers when the latter are moved forwardly and upwardly over the candies, the discharge of said chocolate from the spacers and markers being effected by raising the tongues $m^4$ out of contact therewith and thus dropping the chocolate which otherwise would be held in said spacers and markers.

In the foregoing description I have described one method of operating my improved dipping frame and discharging the candies therefrom, but other methods may be employed, and if desired the framework or similar device shown and described in my prior patent hereinbefore referred to may be employed in the operation of removing the candies from the dipping frame after the candies have been coated with chocolate, but the said framework or similar device forms no part of this invention and is therefore not shown and described.

It will be observed that the main parts of the candy dipping and coating frame shown and described herein are of the same construction as the similar parts shown, described and claimed in my prior patent hereinbefore referred to, the invention which forms the basis of this application being the construction and operation of the holder frame $k$ including the flexible cords $k^7$ by which the candies are held on the pins $e^2$, and the rod $m^3$ provided with the tongues $m^4$ by which a supply of chocolate is held in the scoop-shaped or spoon-shaped spacers and markers $j$, and the means for operating the rod $m^3$. It will also be observed that the rod or bar $e$ and pins $e^2$ connected therewith form a forwardly and backwardly movable support for the candies while the frame is being operated and agitated, while the rods $k^2$ and $k^4$ and transversely arranged wires $k^5$ form a U-shaped frame provided in the bottom thereof with longitudinally arranged flexible cords, said frame serving to hold the candies on the support composed of the parts $e$ and $e^2$, and it will be understood that the flexible cords $k^7$ are elastic as well as flexible in order to accomplish this result, and various changes in the form and construction of the candy support and means for discharging the chocolate in the scoops $j$, and in the form and construction of the candy-holding frame which carries the flexible and elastic cords $k^7$, and in means for operating said part may be made without departing from the spirit of my invention or sacrificing its advantages. It will also be apparent that my improved candy dipping and coating device may be used for the purpose of coating candies with chocolate or other material without the marking devices comprising the scoops $j$, the tongues $m^4$ and the supports with which said parts are connected, and the marking devices comprising the scoops $j$ and tongues $m^4$ may also be used when desired in connection with any other means for holding the candies on the pins $e^2$ of the candy support.

Having fully described my invention, what I claim as new and desire to secure by Letters Patent, is:—

1. A candy dipping and coating device provided with a forwardly and backwardly movable support on which the candies are adapted to be placed, and a pivoted candy holding frame mounted over said support and provided with longitudinally arranged flexible and elastic cords adapted to hold the candies on said support.

2. A candy dipping and coating device provided with a forwardly and backwardly movable support on which the candies are adapted to be placed, and a pivoted candy holding frame mounted over said support and provided with longitudinally arranged flexible and elastic cords adapted to hold the candies on said support, and means for operating said support and said candy holding frame.

3. A candy dipping and coating device provided with a forwardly and backwardly movable support on which the candies are adapted to be placed, an upwardly and forwardly movable scoop member mounted over said support and longitudinally thereof and provided with equally spaced downwardly directed scoops, a swinging member provided with tongues the points of which normally rest in said scoops, means for operating said candy support and said scoop member, means for raising and lowering the tongue member and holding it in either position, and means for holding the candies on the candy support.

4. A candy dipping and coating device provided with a candy support comprising a forwardly and backwardly movable bar provided with forwardly directed pins, a scoop member mounted over and ranging longitudinally of the candy support and adapted to be moved upwardly and forwardly and provided with equally spaced downwardly directed scoops, a tongue member pivotally supported over the scoop member and provided with downwardly directed tongues adapted to enter said scoops, and a pivoted candy holder frame adapted in one position to rest directly over said pins and provided with flexible and elastic cords which serve to hold the candies on said pins.

5. A candy dipping and coating device provided with a forwardly and backwardly movable candy support on which the candies are adapted to be placed, an upwardly and forwardly movable scoop member having equally spaced downwardly directed scoops, means for holding an amount of chocolate in said scoops and for discharging the same at a predetermined time, and a pivoted frame provided with elastic devices for holding the candies on the support.

6. A candy dipping and coating device provided with a forwardly and backwardly movable candy support, a movable frame provided with flexible and elastic devices for holding the candies on said support, means for moving the candy support forwardly and backwardly, means for raising and lowering said frame, and means for removing the candies from the support when the latter is moved backwardly and for distributing a portion of chocolate thereover.

7. A candy dipping and coating device provided with a forwardly and backwardly movable candy support on which the candies to be coated are adapted to be placed, a movable device provided with flexible and elastic cords for holding the candies on said support, and means for removing the candies from the support when the latter is moved backwardly and for distributing a portion of chocolate over said candies to mark the same.

8. A candy dipping and coating device provided with a forwardly and backwardly movable candy support on which the candies to be coated are adapted to be placed, a movable device provided with flexible and elastic cords for holding the candies on said support, and means for removing the candies from the support when the latter is moved backwardly and for distributing a portion of chocolate over said candies to mark the same, comprising an upwardly and forwardly movable scoop member provided with downwardly directed and equally spaced scoops, and a vertically swinging tongue member provided with tongues which normally enter said scoops.

9. A candy dipping and coating device provided with a forwardly and backwardly movable candy support on which the candies to be coated are adapted to be placed, a movable device provided with flexible and elastic cords for holding the candies on said support, and means for removing the candies from the support when the latter is moved backwardly.

In testimony that I claim the foregoing as my invention I have signed my name in presence of the subscribing witnesses this 6th day of September 1906.

PANAYIOTIS PANOULIAS.

Witnesses:
F. A. STEWART,
C. J. KLEIN.